(12) United States Patent
Hirata

(10) Patent No.: US 7,714,910 B2
(45) Date of Patent: May 11, 2010

(54) IMAGE FILE RECORDING METHOD, IMAGE RECORDING AND PLAYBACK METHOD, IMAGE RECORDING AND PLAYBACK SYSTEM, IMAGE RECORDING APPARATUS, AND IMAGE PLAYBACK APPARATUS

(75) Inventor: Ryuji Hirata, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 499 days.

(21) Appl. No.: 11/711,515

(22) Filed: Feb. 26, 2007

(65) Prior Publication Data
US 2007/0211150 A1   Sep. 13, 2007

(30) Foreign Application Priority Data
Mar. 2, 2006   (JP)   .............................. 2006-056737

(51) Int. Cl.
H04N 5/76 (2006.01)
H04N 5/232 (2006.01)
(52) U.S. Cl. .................. 348/231.5; 348/211.6; 704/270
(58) Field of Classification Search .............. 348/231.5, 348/231.2; 704/270
See application file for complete search history.

(56) References Cited

U.S. PATENT DOCUMENTS

| | | | |
|---|---|---|---|
| 6,661,966 B1 | 12/2003 | Furuyama et al. | |
| 7,146,093 B2 * | 12/2006 | Kageyama et al. | 386/95 |
| 2002/0191079 A1 * | 12/2002 | Kobayashi et al. | 348/207.1 |
| 2006/0177214 A1 * | 8/2006 | Ozawa | 396/374 |
| 2006/0227223 A1 * | 10/2006 | Nagata | 348/231.5 |
| 2006/0256212 A1 * | 11/2006 | Choi | 348/231.99 |
| 2006/0275025 A1 * | 12/2006 | Labaziewicz et al. | 396/72 |
| 2007/0097090 A1 * | 5/2007 | Battles | 345/173 |

FOREIGN PATENT DOCUMENTS

| | | |
|---|---|---|
| JP | 10-177646 | 6/1998 |
| JP | 2000-322300 | 11/2000 |
| WO | WO 2005/011258 | 2/2005 |
| WO | WO 2005/055586 | 6/2005 |

OTHER PUBLICATIONS

Chinese Office Action for Chinese Patent Application No. 200710086134, mailed on Feb. 20, 2009 (6 pgs.) (with English Translation (8 pgs.)).

* cited by examiner

*Primary Examiner*—Sinh Tran
*Assistant Examiner*—Hung H Lam
(74) *Attorney, Agent, or Firm*—Straub & Pokotylo; John C. Pokotylo

(57) ABSTRACT

Clock time information displayable together with a corresponding image upon image playback display is recorded in a header field of an image file as EXIF data, and clock time information specific to a digital camera is recorded in a header field of the image file difference from the header field for the clock time information recorded as the EXIF data. Since the camera-specific time information is recorded in addition to the display time information, even if pictures are taken with a digital camera abroad where there is a difference in time after the display clock time is corrected or changed to the local time, images of the pictures can be playback-displayed in order of actual shooting based on the camera-specific time information.

8 Claims, 6 Drawing Sheets

IMAGE FILE RECORDING METHOD, IMAGE RECORDING AND PLAYBACK METHOD, IMAGE RECORDING AND PLAYBACK SYSTEM, IMAGE RECORDING APPARATUS, AND IMAGE PLAYBACK APPARATUS

CROSS-REFERENCE TO RELATED APPLICATION

This application is based upon and claims the benefit of priority from prior Japanese Patent Application No. 2006-056737 filed on Mar. 2, 2006, the entire contents of which are incorporated herein by reference.

BACKGROUND OF THE INVENTION

1. Field of the Invention

The present invention relates to a method of recording, as an image file, a subject image shot with a digital camera, a method for playback display of the recorded image file by uploading it to a personal computer (PC) or the like, and a system and apparatuses for implementing the methods.

2. Description of the Related Art

Image data shot with a digital camera are typically converted into JPEG format and recorded on a recording medium or the like in an image file format. The DCF standard specifies rules for ensuring image file compatibility among digital cameras of different manufacturers and the EXIF standard specifies rules for recording shooting-related information, such as the shutter speed or shooting date and time data, while ensuring information compatibility. Therefore, data interchangeability is ensured by these standards even if photos are taken with a digital camera of any manufacturer, facilitating user convenience. When image data shot with a digital camera are stored in a storage device in a personal computer (PC) or the like, a folder is generally created on the PC and the image data are copied to the created folder to store and record them as image files. In this recording method, however, since the date and time of creation of the recorded image data is set as the date and time at which the image data were stored and recorded on the PC from the digital camera, the date and time of shooting with the digital camera cannot be known from the recorded image files, making it difficult to manage the image files in order of shooting date and time.

In order to enable sorting of image data in order of shooting date and time, for example, Japanese Patent Application Laid-Open No. 2000-322300 describes that upon reading and recording image data stored in a digital-still camera, the time stamp of a file to be recorded is changed to shooting date and time data on the camera. This publication also describes that the file name and the folder name can also be set as the date and time of creation of the image data, i.e., as the shooting date and time on the camera. During shooting with a digital camera, shot images are recorded as image files on a recording medium loaded or built in the digital camera. At this time, in order to ensure the compatibility of image files, a recording format and the like are typically prescribed pursuant to each of the above-mentioned standards. The shooting date and time is recorded in each image file together with its file name so that upon playback display of the image, the shooting date and time is also displayable on a screen. There have been needs to display the shooting date and time together with the image since long ago, and even many of film cameras have a function for optically recording the shooting date and time on a film upon exposure so that the user can figure out the shooting date and time on its print.

In the meantime, many people go abroad nowadays on business or for pleasure, and when going abroad where there is a difference in time, some confusion exists about shooting date and time, causing a problem. For example, assuming that a user departed from Japan at 18:30 on January 15 and arrived in San Francisco after eight hours of flying, the arrival time in San Francisco is 2:30 on January 16 in Japan Standard Time. However, since there is a time difference of 17 hours between Japan and San Francisco (i.e., in San Francisco, it is 17 hours later than in Japan), the local time in San Francisco is 9:30 on January 15. It means that the local arrival time is earlier than the departure time from Japan on the same day. In generally, since travelers adjust their schedule to the local time, they usually set their watches or the like to the local time upon or immediately before the arrival at the local place.

As for a digital camera carried abroad with a user on his-or her trip, if the clock time set in a clock function built in the camera to decide on the shooting time to be recorded in each image file is not changed at all, the time for each shot image is all recorded in Japan Standard Time, and displayed in Japan Standard Time upon image playback. Therefore, for example, the time displayed on an image shot in the daytime at a local sightseeing place could be a midnight time due to a time difference from Japan. In such a case, it cannot be denied that there is a sense of discomfort between the time displayed together with the image and the image content. At the local place, since the user has set his or her watch to the local time to adjust his or her schedule to the local time, it is desirable that the time displayed together with the playback image should be represented in the local time. In order to avoid causing this sense of discomfort, the clock time set by the clock function built in the digital camera has only to be changed to the local time. However, in the above example, the departure time from Japan is 18:30 on January 15, while the local arrival time is 9:30 on the same day. In this case, for example, an image shot at the time of departure from Japan is dated January 15, 18:30. Suppose here that the user adjusted the time clock of the digital camera to the local time on an airplane during eight hours of flying, and took a picture with the digital camera when the airplane landed at the airport in San Francisco. In this case, the image shot upon arrival is dated January 15, 9:30. Since the shooting time of the image shot upon arrival is inconsistent in terms of the order of shooting, the order of shooting time of the recorded image does not match with the order of actual shooting date and time, thus causing confusion.

After taking a large number of pictures abroad and going back to Japan, if the user uploads the images to a personal computer or the like for playback display, the order of shooting will become inconsistent with the order of shooting time as mentioned above, ending in undesirable results. If the user took pictures with a single digital camera, the image data representing those pictures can be played back in order of image file name to display the images in order of shooting. However, if the user took pictures with plural digital cameras, e.g., two digital cameras, the images cannot be displayed in order of actual shooting even if they are played back in order of image file name. This point will be described in detail below. Here, it is assumed that two digital cameras made by manufacturer A are used to take pictures.

The details of a file name deciding method vary from manufacturer to manufacture. For example, a digital camera of manufacturer A assigns file names starting from DSCP0001, incrementing the number part by one from the second file name, like DSCP0002, DSCP0003 . . . . Similarly, a digital camera of manufacturer B assigns file names starting from KIMG0001, incrementing the number part by one like KIMG0002, KIMG0003 . . . . Further, a digital camera of manufacturer C assigns file names starting from G1125001, which is followed by G1125002 . . . in a like manner, except that the first four digits "1125" represent the shooting date. In this case, date information is acquired at the time of shooting from clock means built in the digital camera, and the file name is decided based on the date information. The last three digits represent a number part independent of the date, starting from "001" and followed by "002", "003" . . . . For example, suppose that the first and second frames are shot on November 25 and the third frame is shot on November 26. In this case, respective file names are G1125001, G1125002, and G1126003.

Japanese Patent Application Laid-Open No. 10-177646 discloses a technique teaching that basic information for creating a file name is not reset so that serial numbers (numbers in consecutive order) are assigned across different recording media even if a recording medium is replaced with another as long as shooting is continued with the same digital camera. This function is a very commonly employed technique, and it is assumed here that the two digital cameras of manufacturer A used in the following example have this function so that consecutive file numbers will be assigned.

For example, suppose that the user went abroad with two digital cameras of manufacturer A and took pictures using the two digital cameras in combination. Suppose also that the file names of image files shot with one digital camera are DSCP0114 to DSCP0120 and the file names of image files shot with the other digital camera are DSCP0001 to DSCP0009. Suppose further that, after the total of 16 pieces of image data are uploaded to a PC and stored in a single folder for collective management, the image data are playback displayed in order of file name. Since the order of playback display of the image files is determined according to the alphabetical order and numeric order of the characters forming a character string of each file name, DSCP0001 is first displayed, followed by DSCP0002, DSCP0003, . . . , DSCP0009, then DSCP0009 is followed by DSCP0114, DSCP0115, DSCP0116 . . . , and DSCP0120 comes last. In this case, the order of image display will be inconsistent with the order of actual shooting unless after pictures corresponding to DSCP0001 to DSCP0009 are taken with and recorded on the first camera, the user changes the camera to the second camera to take pictures corresponding to DSCP0114 to DSCP0120. Further, even if the image files are sorted in order of shooting time prior to playback display, the order of shooting time is inconsistent with the order of actual shooting because of the time difference as mentioned above. Therefore, the sorted order does not match with the order of actual shooting. The fact is that it is impossible for the conventional technique to perform playback display of the image files in order of actual shooting after all.

BRIEF SUMMARY OF THE INVENTION

The present invention has been made in view of the above-mentioned problem, and it is a main object thereof to provide a method and system capable of performing playback display of image files in order of actual shooting date and time, and a recording or playback apparatus for implementing the same.

In an image file recording method of the present invention, clock time information displayable together with a corresponding image upon image playback display is recorded in a header field of an image file as EXIF data, and clock time information specific to a digital camera is recorded in a header field of the image file difference from the header field for the clock time information recorded as the EXIF data.

In an image recording/playback method of the present invention, upon recording an image of a subject captured with an imaging/recording apparatus in recording means as an image file with a file name assigned thereto, first shooting time information is recorded to be displayable together with the display image upon image playback display of the image file recorded in the recording means, and second shooting time information is recorded in the image file to be set independently of the displayed shooting time so that the order of shooting with the imaging/recording apparatus can be identified, and upon playback display of the image file, any one of image playback display in order of time based on the first shooting time information, image playback display in order of time based on the second shooting time information, and image playback display in order of image file name is made available, and the first shooting time information is made always displayable together with the playback image upon playback display regardless of the order of playback display.

An image recording/playback system of the present invention comprises: an image recording apparatus for, upon recording an image of a subject captured with an imaging/recording apparatus in recording means as an image file with a file name assigned thereto, recording first shooting time information in the image file to be displayable together with the display image upon image playback display of the image file recorded in the recording means, and recording second shooting time information in the image file to be set independently of the displayed shooting time so that the order of shooting with the imaging/recording apparatus can be identified; and an image playback apparatus for making available any one of image playback display in order of time based on the first shooting time information, image playback display in order of time based on the second shooting time information, and image playback display in order of image file name, and making the first shooting time information always displayable together with the playback image upon playback display regardless of the order of playback display.

In an image recording apparatus of the present invention, upon recording an image of a subject captured with an imaging/recording apparatus in recording means as an image file with a file name assigned thereto, first shooting time information is recorded in the image file to be displayable together with the display image upon image playback display, on an image playback apparatus, of the image file recorded in the recording means, and second shooting time information is recorded in the image file to be set independently of the displayed shooting time so that the order of shooting with the imaging/recording apparatus can be identified, whereby any one of image playback display in order of time based on the first shooting time information, image playback display in order of time based on the second shooting time information, and image playback display in order of image file name is made available on the image playback apparatus, and the first shooting time information is made always displayable together with the playback image upon playback display regardless of the order of playback display.

In an image playback apparatus of the present invention, when performing playback display of an image file recorded by an image recording apparatus for, upon recording an image of a subject captured with an imaging/recording apparatus in recording means as the image file with a file name assigned thereto, recording first shooting time information in the image file to be displayable together with the display image upon image playback display of the image file recorded in the recording means, and recording second shooting time information in the image file to be set independently of the displayed shooting time so that the order of shooting, with the imaging/recording apparatus can be identified, any one of image playback display in order of time based on the first shooting time information, image playback display in order of time based on the second shooting time information, and image playback display in order of image file name is made available, and the first shooting time information is made always displayable together with the playback image upon playback display regardless of the order of playback display.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENTS

A preferred embodiment of the invention is described below with reference to the accompanying drawings.

According to the present invention, first time information (display time information) capable of being displayed together with a display image and second time information (camera-specific time information) capable of identifying the order of shooting are both recorded in an image file, so that any one of image playback display in order of time based on the first shooting time information, image playback display in order of time based on the second shooting time information, and image playback display in order of image file name is made available. Further, even if the image display is performed in any order, the first shooting time information is made always displayable together with the display image.

Figure 1:
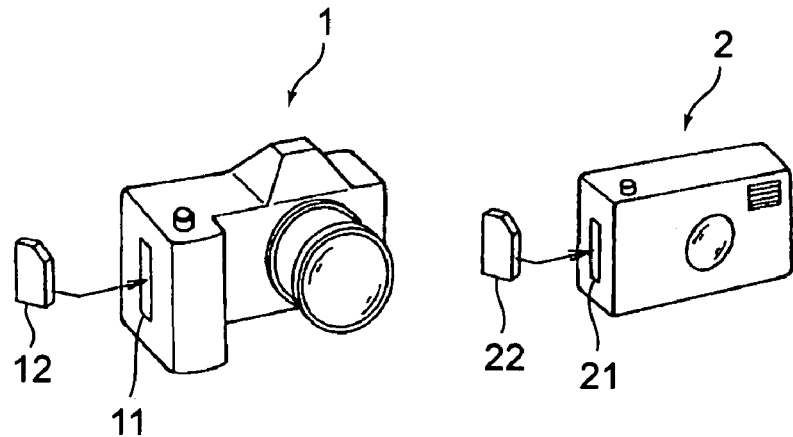
FIG. 1 is a view showing a camera system according to a preferred embodiment of the present invention.

The embodiment of the present invention will be described in details below with reference to the accompanying drawings. FIG. 1 shows a camera system in the embodiment of the present invention. The camera system in the embodiment of the present invention is comprised of two digital cameras, namely a single-lens reflex type digital camera 1 and a compact type digital camera 2.

Here, it is assumed that the digital cameras 1 and 2 are both made by manufacturer A. In other words, the file name starts from DSCP0001 as mentioned above in both the digital cameras 1 and 2, and the number part of the file name is increased to DSCP0002, DSCP0003 . . . each time an image is shot and recorded. The digital cameras 1 and 2 have memory card slots 11 and 21 capable of removably loading recording media, respectively, and memory cards 12 and 22 as recording media are loaded into corresponding memory card slots 11 and 21, respectively.

Figure 2A:
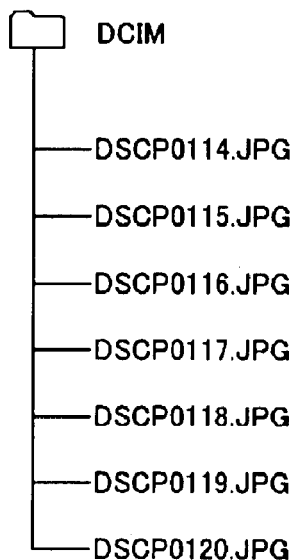
FIG. 2A is a view showing a structure of data recorded on a memory card of a digital camera.
Figure 2B:
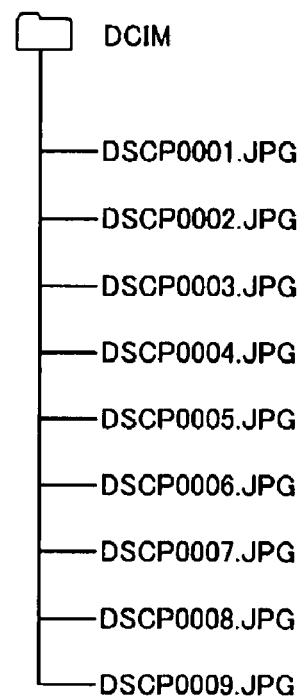
FIG. 2B is a view showing another structure of data recorded on another memory card of another digital camera.

FIGS. 2A and 2B show data structures of image file data shot with the digital cameras 1 and 2 and recorded on the memory cards 12 and 22, respectively. As shown, a plurality of image files are recorded in a line below a folder named DCIM in a tree structure.

As shown in FIG. 2A, there are seven image files DSCP0114 to DSCP0120 containing image data shot with the digital camera 1 and recorded on the memory card 12 as the image files. Similarly, as shown in FIG. 2B, there are nine image files DSCP0001 to DSCP0009 containing image data shot with the digital camera 2 and recorded on the memory card 22 as the image files. In other words, a total of 16 image files containing image data shot with the two digital cameras are recorded in a distributed manner on the two memory cards 12 and 22, respectively.

Here, the assignment of file names on the digital camera 1 is started from DSCP0114 and there are no file names DSCP0001 to DSCP0113, each having a lower number in its number part than DSCP0114. It means either that corresponding image files have already been moved or erased and hence the image files themselves are not left on the memory card 12, or that the image files DSCP0001 to DSCP0113 have been already recorded on a memory card loaded immediately before the memory card concerned is newly loaded into the digital camera 1. The digital cameras 1 and 2 are assumed to have such a function not to reset the starting file name as described in Japanese Patent Application Laid-Open No. 10-177646 mentioned above as, related art of the present invention.

Figure 3:
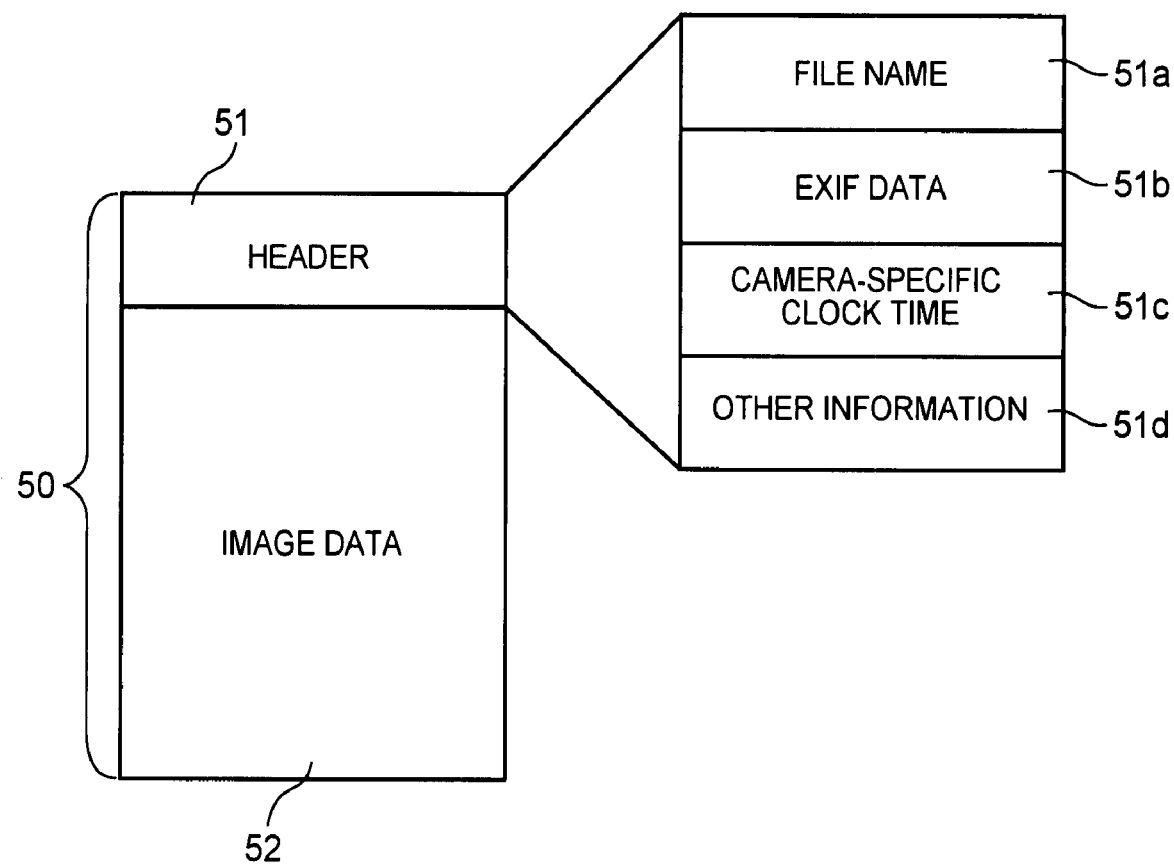
FIG. 3 is a view showing the data structure of an image file.

FIG. 3 schematically shows the data structure of an image file, indicating an image file 50 having a header part 51 and an image data part 52. In the header part 51, various kinds of information related to the image data are stored, while in the image data part 52, image information as one piece of image data corresponding to one shot image is stored. The various kinds of information stored in the header part 51 are its file name and EXIF data, but the header part 51 can also target various other kinds of information, such as a classification code related to the image data, history information on the image data, ID information, print-related information, etc. In the embodiment, the file name is stored in a field 5a of the header part 51 and known EXIF data is stored in a field 51b. Further, information on time specific to the digital camera (camera-specific time or original time) characterized by the present invention is stored in a field 51c. The details of the camera-specific time will be described later. The other various kinds of information related to the image data are stored in a field 51d, such as the classification code related to the image data, history information on the image data, ID information, print-related information, etc.

Figure 4:
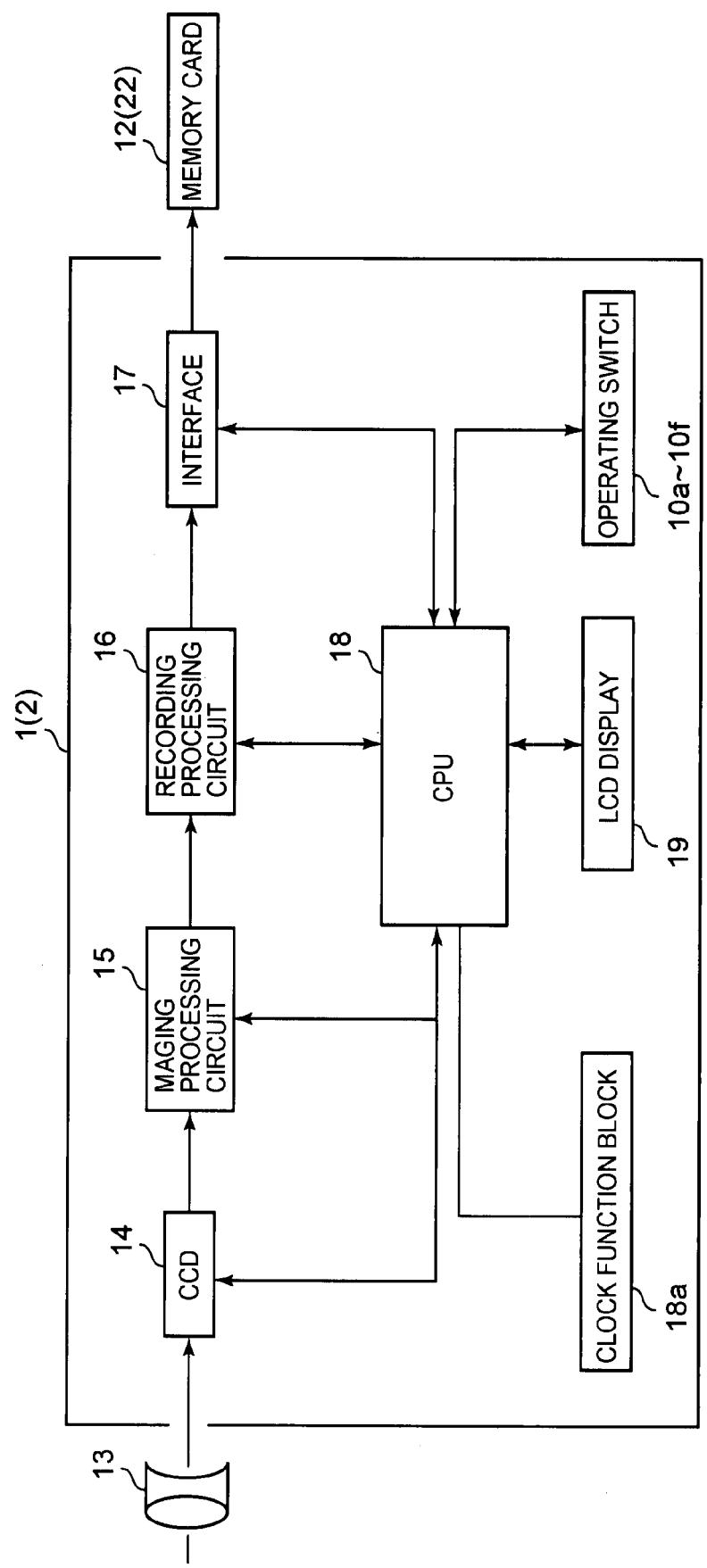
FIG. 4 is a block diagram of the main part of a digital camera.

FIG. 4 illustrates a block diagram of the main part of the digital camera 1. As shown in FIG. 4, a subject image acquired through a photographing lens 13 is formed on a CCD 14, and the formed subject image is photoelectrically converted, and subjected to necessary imaging processing in an imaging processing circuit 15. Further, the subject image is converted in a recording processing circuit 16 into an image file format, for example, JPEG format, and recorded on the memory card 12 through an interface 17. A display 19 such as an LCD is to display an image to be recorded on the memory card or an image(s) already recorded on the memory card and to be played back, or to provide a display upon setting camera operations and camera various functions and modes. The CCD 14, the imaging processing circuit 15, the recording processing circuit 16, and the interface 17 are centrally controlled by a central processing circuit (CPU) 18.

The CPU 18 has a clock function block 18a, and the clock function block 18a has a function capable of creating two kinds of clock times: one being a clock time specific to the digital camera 1 and the other being a display clock time correctable by the user. Operating switches 10a to 10f are also connected to the CPU 18 to make changes in the settings of various functions and modes of the digital camera 1. The digital camera 2 also has substantially the same block structure, and the following description assumes that the digital cameras 1 and 2 have the same structure unless particularly noted.

Figure 5:
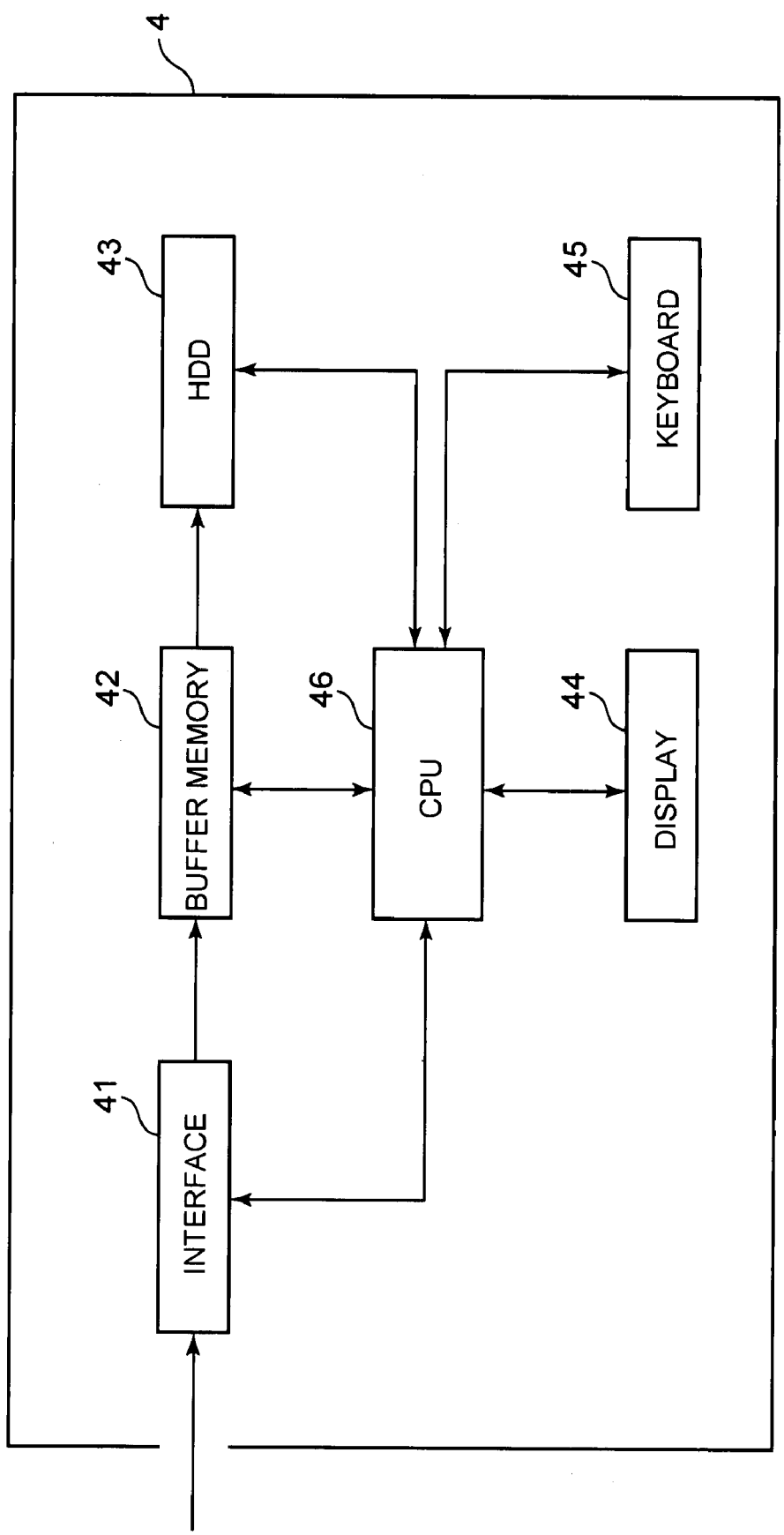
FIG. 5 is a block diagram of a personal computer.

FIG. 5 illustrates a block diagram of the main part of a personal computer (PC) 4. As shown in FIG. 5, an interface 41 for acquiring image files is provided in the PC 4. For example, the interface corresponds to a PC card slot or a USB connector, or it can be a memory card slot. Provided further in the PC 4 are a buffer memory 42 for temporary storage of the image files acquired through the interface 41, a hard disk drive (HDD) 43 as large-capacity recording means, a display 44 such as an LCD for displaying the content of image data and/or providing information to a user, and a keyboard 45 as command input means. These components are centrally controlled by a central processing circuit (CPU) 46.

Figure 6:
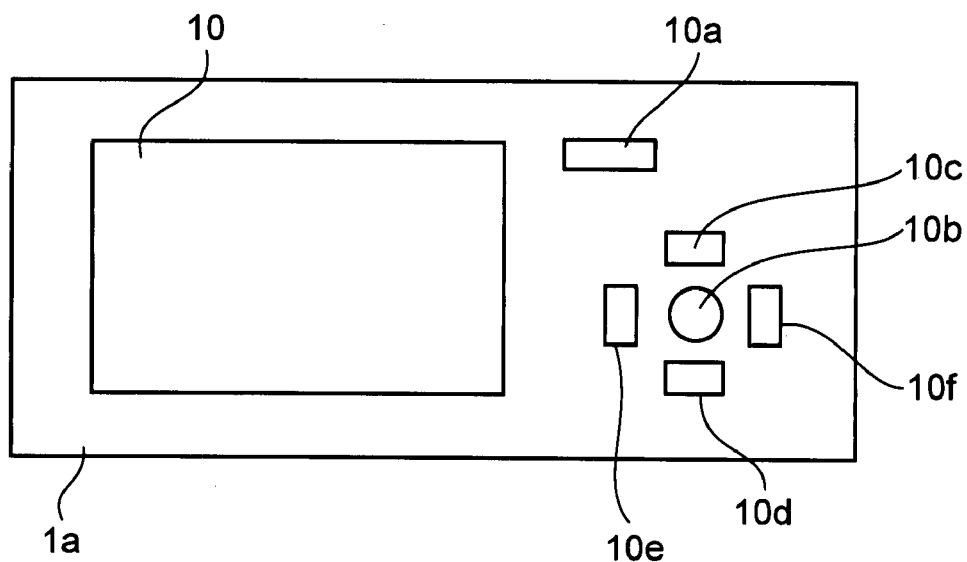
FIG. 6 is a back view of the digital camera.

FIG. 6 illustrates a back view of the digital camera. Note in FIG. 6 that, although the digital camera 1 is described as a single-lens reflex type digital camera, the compact type digital camera 2 also has the same or similar structure.

As shown in FIG. 6, the LCD display 19 is arranged on the backside of the digital camera 1, and a menu key 10a and an OK key 10b are arranged at the side of the LCD display 19. Then, selection keys 10c, 10d, 10e and 10f are arranged on the up, down, left, and right sides of the OK key 10b, respectively. Note that the kinds and arrangement of the operating switches mentioned above are just illustrative examples.

The following describes procedures for making changes in the display clock time and the camera-specific clock time. First, the user operates the menu key 10a when the power of the digital camera 1 is on. As a result, the LCD display 19 is switched to a menu screen (not shown), and the user selects a time editing mode from the menu screen using the selection keys 10c to 10f. When the time editing mode is selected, the LCD display 19 is switched to a display as shown in FIG. 7.

Figure 7:
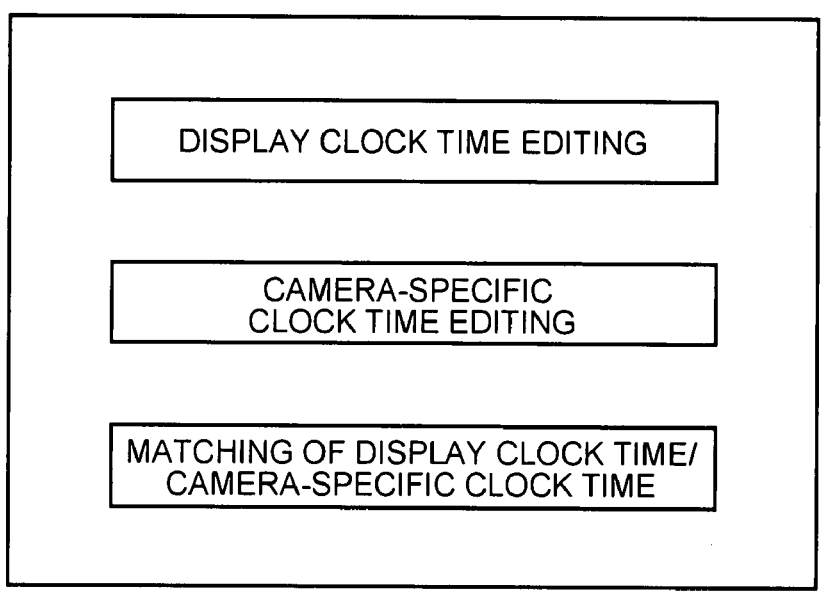
FIG. 7 is a view showing time editing modes on an LCD display provided on the backside of the digital camera.

FIG. 7 shows a state where options of the time editing mode are displayed on the LCD display 19 provided on the backside of the digital camera. As shown in FIG. 7, as the options of the time editing mode, the following three modes are displayed: (1) a mode for editing the display clock time, (2) a mode for editing the camera-specific clock time (original time), and (3) a mode for matching the display clock time to the camera-specific clock time. The user selects any one of the three modes displayed on the LCD display 19 using the selection key 10c or 10d. For example, if the user selects the mode for editing the display clock time from the three modes using the selection key 10c or 10d and then presses the OK key 10b, the display screen on the display 19 moves to an editing screen as shown in FIG. 8.

Figure 8:
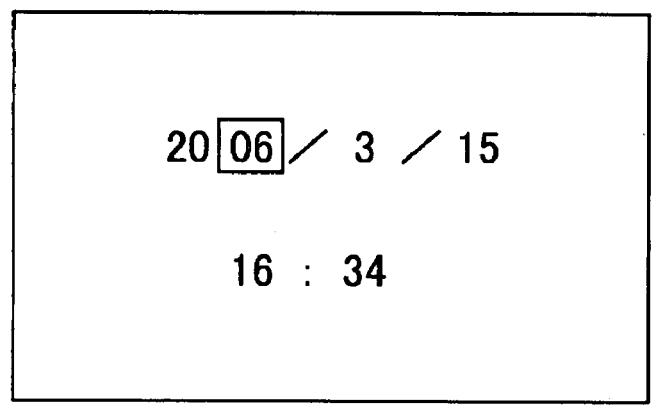
FIG. 8 is a view showing a time editing screen on the LCD display provided on the backside of the digital camera.

FIG. 8 shows the time editing screen on the LCD display provided on the backside of the digital camera. As shown in FIG. 8, the display date and time, Mar. 15, 2006, 16:34, currently set on the digital camera appears on the LCD display 19 with the last two digits, 06, of the year highlighted with a box. Under this condition, when the user operates the selection key 10c or 10d, the last two digits, 06, are changed to 07, 08, . . . or 05, 04, . . . . Here, for example, if the user wants to change the display clock time to a local time such as that in San Francisco, the user has only to set the date and time back 17 hours corresponding to the time difference from Japan. The highlighted box can be shifted from Year to Month or to Day using the selection keys 10e and 10f, and the digits highlighted in the box can be changed using the selection key 10c or 10d in the same manner as the case of changing Year as mentioned above. This editing results in a change in clock time information of the clock function for generating clock time data to be recorded in the field 51b of the header part of each image file as EXIF data for generating clock time information capable of being displayed together with a corresponding image.

After completion of editing the date and time, if the OK key 10b is pressed, the display screen on the LCD display 19 returns to the state shown in FIG. 7. Then, under the condition of FIG. 7, if the menu key 10a is pressed, the LCD display 19 returns to the menu screen (not shown). After that, if the menu key 10a is pressed again, it returns to an initial screen. The initial screen is a screen of live view (real-time vide picture) of a subject during a camera shooting operation, or it is a screen of image playback display when the camera is in a playback mode.

Similarly, when the user selects the mode for editing the camera-specific clock time (original time) from the three time editing modes shown in FIG. 7, the display screen on the display 19 also moves to the editing screen as shown in FIG. 8. The procedure for editing the camera-specific clock time itself is totally the same as the case of the above-mentioned display clock time editing. After the camera-specific clock time is edited, clock time information of the clock function for generating camera-specific time data to be recorded in the field 51c different from the field 51b for recording EXIF data in the header part is changed.

The above-mentioned display clock time editing is performed when there is a time difference from Japan such as during overseas travel, while the camera-specific clock time editing is performed to correct a clock error when the clock is slow or fast. In addition, when the clock function is reset due to battery exhaustion, the camera-specific clock time also needs to be reset, and therefore the camera-specific clock time editing needs performing. However, in this case, the camera-specific clock time editing function can be made unnecessary if, for example, not only the digital camera has a backup system using a solar battery or the like and hence it is free from battery worries, but also the clock is a radio-wave clock not to cause the clock to be slow or fast.

As described above with reference to FIG. 8, the display clock time editing is typically performed by changing Year, Month, Day, Hour, and Minute, respectively. Alternatively, a world map or GMT (Greenwich Mean Time) of each of plural areas can be displayed on the LCD display 19 of the digital camera 1 so that the user can select an area where he or she is now using the selection keys to correct the time difference automatically and conveniently in order to change the display clock time to the local time. Further, a GPS (Global Positioning System) can be incorporated in the digital camera 1 to automatically select the place where the user is using the GPS function. Thus, if the world map or the GMTs are displayed on the LCD display 19 or the GPS function is employed, the display clock time editing can be performed quickly and accurately.

After the display clock time editing is performed, the shooting date and time information to be recorded as EXIF data at the time of shooting becomes the changed date and time information. In other words, since the EXIF data is used to display shooting date and time information upon playback display of a corresponding image, the changed date and time is displayed on the LCD display 19 provided on the backside of the digital camera. Therefore, even in the above-mentioned example during staying in San Francisco, a shot image is playback-displayed with a date and time stamp in the local time, so that there is no discomfort between the displayed clock time and the image content. Since the EXIF data supports compatibility among different manufacturers, it is rational to decide the display clock time based on the EXIF data.

The following describes the relationship between the display clock time and the camera-specific clock time (original time) in more detail. The display clock time is displayed when a corresponding image is playback-displayed. Therefore, it is preferable to be changed at a place having a time difference from user's home country, that is, from Japan in this case. On the other hand, the camera-specific clock time is a home time. In this case, since the home country of the user is Japan, the camera-specific time is Japan Standard Time having no domestic time difference.

According to the present invention, this camera-specific clock time is recorded in each image file, so that the order of image shooting can be identified based on the camera-specific time even if the display clock time is corrected or changed. In other words, two kinds of clock time information, namely the display clock time information used upon image playback and the camera-specific clock time information for identifying the order of image shooting, are recorded in each image file.

Returning to FIG. 7, the following describes the mode for matching the display clock time and the camera-specific clock time, i.e., to be more specific, for matching the display clock time to the camera-specific clock time.

This mode is a mode operated upon setting the display clock time back to Japan Standard Time (camera-specific time or original time) by the user coming back to Japan after taking pictures abroad where there was a time difference from Japan and hence the user changed the display clock time to the local time. When this mode is selected, a message asking "Do you want to return to Japan Standard Time?" appears on the LCD display 19 of the digital camera 1, and if the user presses the OK key 10b, the display clock time is replaced with the camera-specific time. This operation makes it possible to reset the display clock time even if a long time has elapsed since the display clock time was changed and hence there is a slight time deviation, such as slowing or speeding up, of the display clock time from the camera-specific clock time in addition, to the time difference. Further, the setting-back operation to Japan Standard Time can be done at one touch of the OK key 10b in response to the message asking, "Do you want to return to Japan Standard Time?" Thus, the mode for replacing (matching) the display clock time with (to) the camera-specific clock time makes it possible to replace the display clock time with the camera-specific clock time in one-touch operation to match the display clock time to the camera-specific time accurately, thereby omitting the clock time editing operation as described in FIG. 8 to perform the clock time editing quickly and accurately.

The following describes about the clock time information to be recorded in each image file upon shooting using this digital camera.

Upon shooting in Japan, the clock time information on both the camera-specific clock time and the display clock time to be generated by the clock function inside the digital camera is represented in Japan Standard Time. For example, if an image shot in Japan is dated Dec. 15, 2005, 11:33, both the clock time recorded as the EXIF data in the field 51b and the clock time recorded as the camera-specific time in the field 51c indicate Dec. 15, 2005, 11:33. On the other hand, in the above-mentioned example of going to San Francisco where the user needs to change display clock time after departure from Japan, if the camera-specific time on the digital camera is Jan. 16, 2006, 2:30 in Japan Standard Time, the display clock time changed by the user is Jan. 15, 2006, 9:30 in the local time (U.S. Western Standard Time). Therefore, if the user takes a picture upon arrival in San Francisco, the clock time recorded in the filed 51b as the EXIF data is Jan. 15, 2006, 9:30, while the clock time recorded in the field 51c as the camera-specific time is Jan. 16, 2006, 2:30.

Suppose here that image files containing such two kinds of clock time information (display clock time information and camera-specific clock time information) are copied from the digital cameras 1 and 2 to a personal computer (PC). The following describes image playback on the PC in this case.

The image playback function on the PC typically allows the user to select the playback order between the order of image file name and the order of date and time of image file creation. For the date and time of image file creation, EXIF data as the date and time information having data compatibility is employed. Therefore, in the case where images shot in Japan (home country) and images shot abroad (San Francisco) having a time difference from Japan mixed, it is impossible to perform playback display of the images on the normal PC in order of actual shooting. Therefore, according to the present invention, software dedicated to image playback is started to perform playback display of the shot images. The playback display via this dedicated software will be described below.

Figure 9:
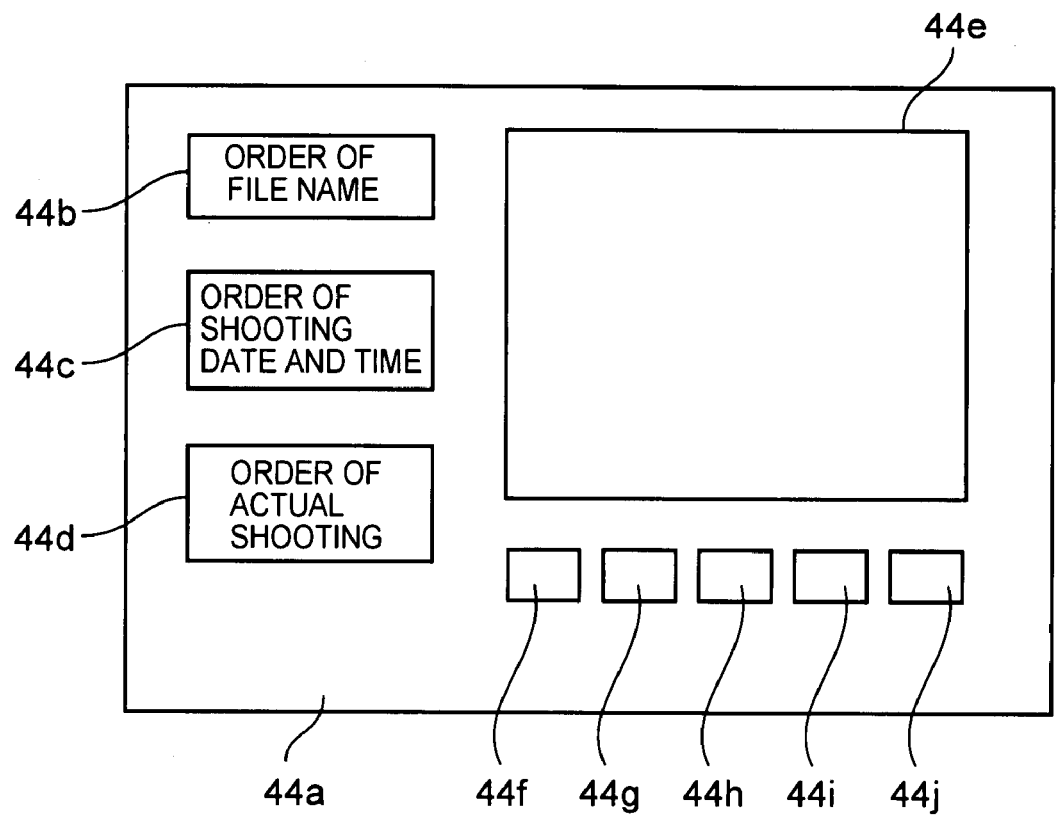
FIG. 9 is a view showing a monitor display on the personal computer.

After power-on of the PC 4, when the dedicated software is started, a screen, for example, as shown in FIG. 9 appears on the display 44 of the PC. As shown in FIG. 9, operation instruction areas 44b to 44d for selectively designating the order of image playback, a display area 44e for showing a shot image upon playback display, and display areas 44f to 44j for showing thumbnail images before and after the image being displayed in the display area 44e are arranged inside a display screen 44a of the display 44. Among the operation instruction areas, 44b is a switch to select a mode for playback display of the shot images in order of image file name, 44c is a switch to select a mode for playback display of the shot images in order of shooting date and time displayable on the respective images, and 44d is a switch to select a mode for playback display of the shot images in order of actual shooting. The user can select any one of the switches 44b to 44d to decide on the playback display mode.

In the embodiment, the image files are selected automatically in order of file name by default unless the user selects a playback display mode, but the present invention is not limited thereto. The selection is achieved by selecting any one of the switches 44b to 44d with the click of a mouse or using the keyboard 45. Among the thumbnail images displayed in the display areas 44f to 44j, the image in the center display area 44h is a thumbnail image of the image currently being displayed in normal size in the display area 44e. Further, 44g shows a thumbnail image immediately previous to 44h and 44f shows a thumbnail image immediately previous to 44h in image playback order, while 44i shows a thumbnail image immediately subsequent to 44h and 44j shows a thumbnail image immediately subsequent to 44i in image playback order, respectively.

As mentioned above, when the switch 44b is selected, the order of image playback is decided based on the image file name. When the switch 44c is selected, the order of image playback is decided based on the display clock time corresponding to the EXIF data. On the other hand, when the switch 44d is selected, the order of image playback is decided based on the clock time information specific to the camera (camera-specific time information) recorded in the field 51*c*. Even if any of the playback orders is selected, the clock time displayed together with a corresponding image is the display clock time, and the camera-specific time information is not displayed. The camera-specific time information is used by the user (photographer) strictly for the purpose of identifying the shooting order.

Thus, if the switch 44*d* is selected, it is ensured based on the camera-specific time information that image playback is performed in order of actual shooting. In other words, the order of image playback is identified based on Japan Standard Time (camera-specific time) in the above-mentioned example. Therefore, even if the user took images using two or more digital cameras in combination, the images can be playback-displayed in order of shooting date and time. Further, even if the user took images abroad, where there is a time difference, using two or more digital cameras in combination, the images can not only be playback-displayed in order of shooting time, but also edited and recorded in order of actual shooting date and time, thus serving a useful function.

The aforementioned embodiment is just an illustrative example of this invention, and this invention is not limited to the embodiment at all. It should be noted that any modification and change made within the technical scope of this invention can, of course, be included in this invention.

For example, although the description of the aforementioned embodiment is made based on the camera system including the single-lens reflex type digital camera 1 and the compact type digital camera 2 made by manufacturer A, any other combination of the kinds or the number of digital cameras is possible without departing from the gist of the present invention, and mixed use of cameras made by different manufacturers is also possible.

Further, in the aforementioned embodiment, the present invention is targeted for image data shot with the digital camera. However, the present invention is not limited thereto, and the image data can be acquired from any other equipment having a function equivalent to the digital camera. For example, a cellular phone capable of recording data shot with its camera function and sending the data to a PC using its mail function can be used instead of the digital camera. Further, the target image data is also not limited to the still image, and it can be a moving image, e.g., video data from a digital video camcorder.

Further, in the aforementioned embodiment, the image data from the digital camera are stored and managed collectively using the personal computer (PC) to display playback images. However, the present invention is not limited thereto, and any other equipment having an equivalent function can be used instead of the PC. For example, a card reader having a memory function such as a hard disk or recording medium, a digital video camcorder, a DVD recorder/player, or a TV set with a built-in hard disk can also be used.

As described above, according to the present invention, since clock time information specific to camera (camera-specific time information) is recorded in each image file in addition to clock time information displayable together with the playback image upon playback display, even if images are shot abroad, where there is a time difference, using two or more cameras in combination after setting the cameras' clocks to the local time, images shot in the home country and images shot in the destination country can be playback-displayed in order of actual shooting.

The present invention can be widely applied to image recording/playback systems for storing and collectively managing, on a personal computer or the like, image data shot with and recorded on digital cameras and the like after assigning each file name, shooting date and time, etc. to the image data.

While there has been shown and described what is considered to be a preferred embodiment of the invention, it will, of course, be understood that various modifications and changes in form or detail could readily be made without departing from the spirit of the invention. It is therefore intended that the invention not be limited to the exact forms described and illustrated, but constructed to cover all modifications that may fall within the scope of the appended claims.

What is claimed is:

1. An image recording/playback display method comprising:

upon recording an image of a subject captured with an imaging/recording apparatus in recording means as an image file with a file name assigned thereto, recording first clock shooting time information in the image file to be displayable together with the display image upon image playback display of the image file recorded in the recording means, wherein the first clock shooting time information can be freely set and changed by a user;

recording second clock shooting time information in the image file to be set, as a time specific to the imaging/recording apparatus, the second clock shooting time information being independent of the displayed first clock shooting time, and identifying an order of shooting with the imaging/recording apparatus; and making available any one of (A) image playback display in order of time based on the first clock shooting time information, (B) image playback display in order of time based on the second clock shooting time information, and (C) image playback display in order of image file name, and displaying the first clock shooting time information together with the playback image upon playback display regardless of the order of playback display.

2. The image recording/playback display method according to claim 1, wherein the first clock shooting time information is made replaceable with the second clock shooting time information such that both pieces of shooting time information match.

3. The image recording/playback display method according to claim 1, wherein the first clock shooting time information is recorded in a header field of an image file as EXIF data, and wherein the second clock shooting time information, which is specific to a digital camera, is recorded in a header field of the image file, the header field of the image file being different from the header field for the first clock shooting time information recorded as the EXIF data.

4. A method for displaying images on a camera, the method comprising:

maintaining a first clock wherein a time of the first clock can be manually set and changed by a user of the camera;

maintaining a second clock, wherein a time of the second clock is specific to the camera;

capturing a plurality of images at a plurality of given times, each of the plurality of given times corresponding to both a first time defined by the first clock and a second time defined by the second clock, wherein the second time of the second clock is different from the first time of the first clock during capturing of at least some of the plurality of images;

recording each of the plurality of images on a recording means as an image file including a header part and an image data part, the header part including a file name, the first time and the second time;

receiving a manual user selection of an image playback order option consisting of (A) image playback display ordered based on the first time, (B) image playback display ordered based on the second time, and (C) image playback display ordered based on image file name; and displaying the image file together with the first time regardless of the received playback order option.

5. The method of claim 4, wherein the manual user selection of an image playback order option received is image playback display ordered based on the second time.

6. The method of claim 4, wherein the act of displaying the image file together with the first time superimposes a display of the first time on a display of the image.

7. The method of claim 4, wherein for each of the plurality of images recorded, the first time is included in the header as EXIF data.

8. The method of claim 7, wherein for each of the plurality of images recorded, the second time is recorded in a header location other than a location of the EXIF data.

* * * * *